Jan. 14, 1936.  P. S. MORGAN  2,027,696

SIGHT GLASS

Filed Aug. 10, 1934

Inventor
Porter S. Morgan
By Albert R. Henry
Attorney

Patented Jan. 14, 1936

2,027,696

UNITED STATES PATENT OFFICE 2,027,696

SIGHT GLASS

Porter S. Morgan, New York, N. Y., assignor to Liberty Share Corporation, Buffalo, N. Y.

Application August 10, 1934, Serial No. 739,284

5 Claims. (Cl. 116—117)

This invention relates to improvements in liquid flow indicators which are particularly adapted for use in a gasoline dispensing apparatus.

The present device is of the general type shown in my copending application, Serial No. 642,573, filed November 14, 1933, and it is similarly concerned with the registration of flow conditions at substantially all rates of liquid flow. In a more specific aspect, the invention resides in the cooperative relation between an indicating element and a motive element therefor, wherein the former element is housed in a transparent portion of the indicator to permit an unobstructed and magnified view thereof, while the motive element is more or less concealed from the observer and yet is organized with the indicating element to provide a prime mover of great sensitivity.

Other features of the invention are more specifically set forth in the accompanying specification and drawing wherein.

Figure 1:
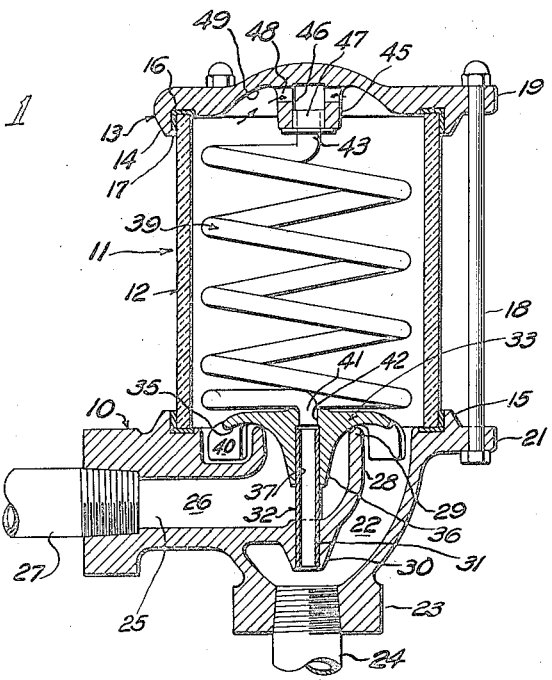
Fig. 1 is a vertical section through the indicator with the rotor in an inoperative position.

The indicator generally comprises a turbine or rotor casing 10 for containing the motive portions of the apparatus, and a transparent casing 11 which is secured to the casing 10 and which contains the driven or indicating elements of the device. Due to manufacturing and assembling practices, it is preferred that the transparent casing be formed of two parts; a glass tube 12, and a head 13 formed with an annular flange 14 to receive the extremity of the tube 12. The rotor casing 10 is formed with a similar flange 15 for receiving the opposite end of the tube. Gaskets 16 and 17 are interposed between these connections to provide fluid-tight joints. Bolts 18 extending through lugs 19 and 21 on the head 13 and casing 10 respectively are utilized to secure the rotor casing 10 to the transparent casing 11.

The rotor casing 10 is formed with an enlarged open outlet chamber 22 in its face, which converges downwardly into an axial fitting portion 23 tapped to receive an outlet pipe 24. An inlet chamber 25 also forms an integral part of the casing, and it includes a radial portion 26, which receives an inlet pipe 27 and a communicating axial portion 28 resembling an L fitting, which is disposed within the outlet chamber 22. The open extremity of the axial portion 28 is cylindrical and preferably concentric with the wall of the outlet chamber, and it is finished to provide a valve seat 29. The wall of the axial portion 28 contains an external hub 30 which is drilled, as indicated by the numeral 31, to receive a small pipe 32 pressed into position to form a pintle bearing for the rotor element. It will be observed that the tapered hub 30 overlies the outlet extremity of the outlet chamber 22 and it is therefore disposed to provide an injector therewith; wherein, during liquid flow through the outlet chamber, the small pipe 32 will be subjected to a suction head.

Figure 4:
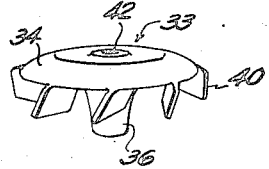
Fig. 4 is a perspective view of the rotor.

The motive portion of the device includes a rotor or turbine 33 which is formed with a mushroom shaped head 34 having a convex valve face 35 and an axial stem 36 merging therewith in a harmonious curve. The stem is drilled to provide a bearing 37 which engages over the pipe 32 to provide a slidable and rotatable connection, serving to maintain the valve face 35 in proper seating relation with the valve seat 29. The periphery of the head is supplied with integral depending vanes 40, which are angularly disposed with respect to both the radial and axial axes of the rotor (Fig. 4), and which project into the open end of the outlet chamber 22.

The transparent casing 11 contains a helically wound tube 39 which serves as the indicating portion of the device, and it is received concentrically within the glass tube 12 with its lower extremity bent to form an axial terminal 41 which is soldered in a drilled hole 42 in the head 34. The hole 42 enters the bearing opening 37 and thus the interior of the tube communicates with the injector portion of the chamber 22 through the pipe 32. The upper extremity of the tube 39 is formed with an axial terminal 43 to which is secured a shouldered bushing 47.

A central hub 45 is formed in the upper head 13, and it contains an axial bearing 46 which receives the bushing 47, which is also formed with radial openings 48 establishing communication between the dome 49 of the head 13 and the interior of the tube 39. It is preferred that the helical tube 39 engage the rotor with a slight resilient thrust to act as a light valve spring, although it will be understood that this arrangement is not necessarily required except where great efficiency is demanded.

The indicator is adapted to be connected in series in a liquid circuit such as in the delivery line of a gasoline dispenser, wherein liquid is directed under pressure through the pipe 27 and into the rotor casing, whence it is delivered through the pipe 24. At low rates of liquid flow, which are most difficult to register in devices of this nature, the passage of liquid from the input chamber 25 to the outlet chamber 22 will be resisted by the valving effect of the head 34 on the seat 29. To lift the head, the slight resistance of the overlying indicating tube 39 must be overcome, since the tube acts as a loading spring for the head. Due to the high velocity of the liquid in its translatory flow of 180 degrees, the vanes 40 are impinged with sufficient force to rotate the head and accompanying indicating tube 39. The advantageous location of the vanes 40 between the chambers and their angular disposal to the liquid stream insures this result, while the relatively large outlet chamber at the delivery end of the vanes acts in a similar manner as the volute chamber in a turbine, to the effect that serious frictional losses are minimized.

Figure 2:
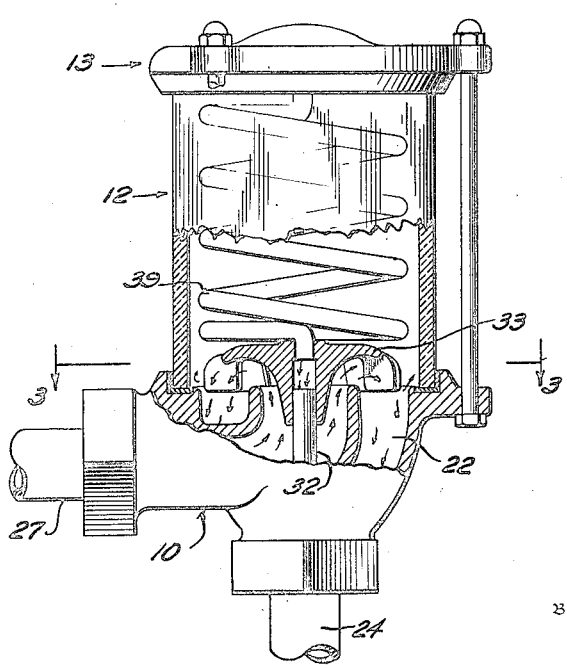
Fig. 2 is a side elevation of the indicator, with portions broken away to show the rotor in an operative position.
Figure 3:
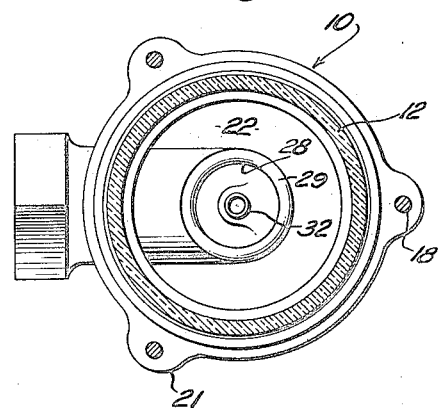
Fig. 3 is a cross section on the line 3—3 of Fig. 2 with the rotor removed.

During full flow conditions, the operation of the indicating device is similar to that of the described slow flow condition, with the exception that the head will be lifted to a greater height (as shown in Fig. 2), and the convolutions of the tube 39 will be further compressed. During variable flow conditions, violent rising of the rotor will be modified or dampened by the resistance of the tube.

In view of the fact that the helical tube 39 occupies the entire space within the glass 12, and that complete observation of its movement is unimpaired by other portions of the device, the rotation thereof is readily discerned by the observer, and the pleasing simulation of axial movement is further amplified by the lens effect of the glass 12, to the end that the apparent diameter of the tube may be magnified several times.

Air or gas volumes delivered with the liquid tend to escape at the periphery of the head 34 and to rise in the glass 12 where they may be fully observed in transit, and, in the case that gasoline is being dispensed, the purchaser will be apprised of the fact that he is being deprived of a full measure of liquid.

The removal of the gas or air trapped at the dome of the head 13 is accomplished by the injector arrangement in the rotor casing 10, wherein the air is drawn through the tube 39, pipe 32, and into the outlet pipe 24, and the glass 12 is thus retained substantially free of gas pockets at all times.

It will be obvious that various structural modifications may be made without altering the principle of operation herein disclosed, and that such modifications may fairly fall within the scope of the features set forth in the appended claims.

I claim:

1. In a liquid flow indicator, a turbine casing having inlet and outlet passages, a turbine mounted for movement therein, a transparent casing disposed above the turbine casing and communicating with the outlet passage whereby air volumes will rise gravitationally in liquid introduced into the transparent casing, a hollow indicating device secured to the turbine, an injector in the outlet passage communicating with said device, said device having an opening adjacent the top of the transparent casing whereby air volumes trapped therein are drawn through said indicating device and into the outlet passage.

2. In a liquid flow indicator, a turbine casing having inlet and outlet passages, a turbine mounted for movement therein, a cylindrical transparent casing disposed above the turbine casing and communicating with the outlet passage whereby air volumes will rise gravitationally in the liquid introduced into the transparent casing, an indicating device comprising a helically wound tube disposed axially in the transparent casing and having one extremity secured to the turbine for operation thereby and its remaining extremity terminating adjacent the top of the transparent casing, and an injector in the outlet passage communicating with said tube, whereby air volumes trapped in the transparent casing are drawn through said tube and into the outlet passage.

3. In a liquid flow indicator, a turbine casing having inlet and outlet passages formed with substantially concentric openings, a transparent casing secured to the turbine casing and having an open end enclosing the passages therein, a turbine rotatably mounted and disposed coaxially with the casing openings, said turbine having a head portion formed to direct liquid from the inlet to the outlet passage and curved vanes disposed in the outlet passage, and an indicating device disposed in the transparent casing and secured to the turbine for rotation therewith, said transparent casing communicating with said outlet passage.

4. In a liquid flow indicator, a turbine casing having an inlet passage terminating in a valve seat, a turbine having a valve face adapted to engage said seat, means for mounting the turbine for rotating and axial movement relative said seat, an outlet passage in the casing communicating with the inlet passage through said seat, a transparent casing secured to the turbine casing and having an open end enclosing the valve seat, a helical display member having one extremity rotatably mounted in the transparent casing and the remaining extremity secured to the turbine, said display member providing a spring to retain the turbine valve in seated position.

5. In a liquid flow indicator, a turbine casing having an inlet passage terminating in a valve seat, a turbine having a valve face adapted to engage said seat, an outlet passage in the casing communicating with the inlet passage through the seat, a pipe mounted in the inlet passage and communicating with the outlet passage, said turbine being mounted on said pipe for rotating and axial movement relative to said seat, a transparent casing secured to the turbine casing and having an open end enclosing said seat, and a helically wound tube having one extremity rotatably mounted in the transparent casing and the remaining extremity secured to the turbine and communicating with said pipe, said tube providing a spring to retain the turbine valve in seated position.

PORTER S. MORGAN.